(12) United States Patent
Ohashi et al.

(10) Patent No.: US 10,160,277 B2
(45) Date of Patent: Dec. 25, 2018

(54) VEHICLE HEIGHT ADJUSTMENT SYSTEM

(71) Applicant: TOYOTA JIDOSHA KABUSHIKI KAISHA, Toyota-shi, Aichi-ken (JP)

(72) Inventors: Hideki Ohashi, Chiryu (JP); Katsuyuki Sano, Miyoshi (JP); Jun Tokumitsu, Toyota (JP); Ryo Kanda, Nissin (JP); Shogo Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 15/355,588

(22) Filed: Nov. 18, 2016

(65) Prior Publication Data

US 2017/0151849 A1    Jun. 1, 2017

(30) Foreign Application Priority Data

Nov. 27, 2015 (JP) .................. 2015-231375

(51) Int. Cl.
*B60G 17/015* (2006.01)
*B60G 17/016* (2006.01)
*B60G 17/017* (2006.01)
*B60G 17/052* (2006.01)

(52) U.S. Cl.
CPC ....... *B60G 17/0155* (2013.01); *B60G 17/016* (2013.01); *B60G 17/017* (2013.01); *B60G 17/0157* (2013.01); *B60G 17/0525* (2013.01); *B60G 2204/62* (2013.01); *B60G 2204/80* (2013.01); *B60G 2400/252* (2013.01); *B60G 2400/51* (2013.01); *B60G 2400/952* (2013.01); *B60G 2500/30* (2013.01)

(58) Field of Classification Search
CPC .. B60G 17/00; B60G 17/015; B60G 17/0152; B60G 17/0155; B60G 17/0157; B60G 17/016; B60G 17/017; B60G 17/0195; B60G 17/0523; B60G 17/0525; B60G 2400/952; B60G 2500/30
See application file for complete search history.

(56) References Cited

U.S. PATENT DOCUMENTS 5,430,647 A * 7/1995 Raad .................... B60G 17/016
                                                            180/41
2006/0284388 A1   12/2006   Nakashima et al.

FOREIGN PATENT DOCUMENTS

| DE | 102008006848 A1 | 8/2009 | |
|---|---|---|---|
| DE | 102010017237 A1 | 12/2011 | |
| EP | 2878462 A2 * | 6/2015 | ........... B60G 17/017 |
| JP | H03-70615 A | 3/1991 | |

(Continued)

*Primary Examiner* — Adam R Mott
(74) *Attorney, Agent, or Firm* — Oliff PLC

(57) ABSTRACT

A vehicle height adjustment system includes: a vehicle height adjustment actuator provided for each wheel of a vehicle; a pressure medium intake and exhaust device configured to supply and exhaust a pressure medium to and from the vehicle height adjustment actuator; and a vehicle height adjustment unit including a computer, the vehicle height adjustment unit configured to: adjust a vehicle height by controlling the pressure medium intake and exhaust device, the vehicle height being a distance between the wheel and a vehicle body; adjust the vehicle height when a get-in estimation condition is satisfied; and limit a number of times the vehicle height is adjusted within a set period to a number of times smaller than a set number of times.

12 Claims, 11 Drawing Sheets

(56) References Cited

FOREIGN PATENT DOCUMENTS

| JP | 2003-267022 A | 9/2003 |
|----|---------------|--------|
| JP | 2006-341665 A | 12/2006 |
| JP | 2007-118694 A | 5/2007 |

* cited by examiner

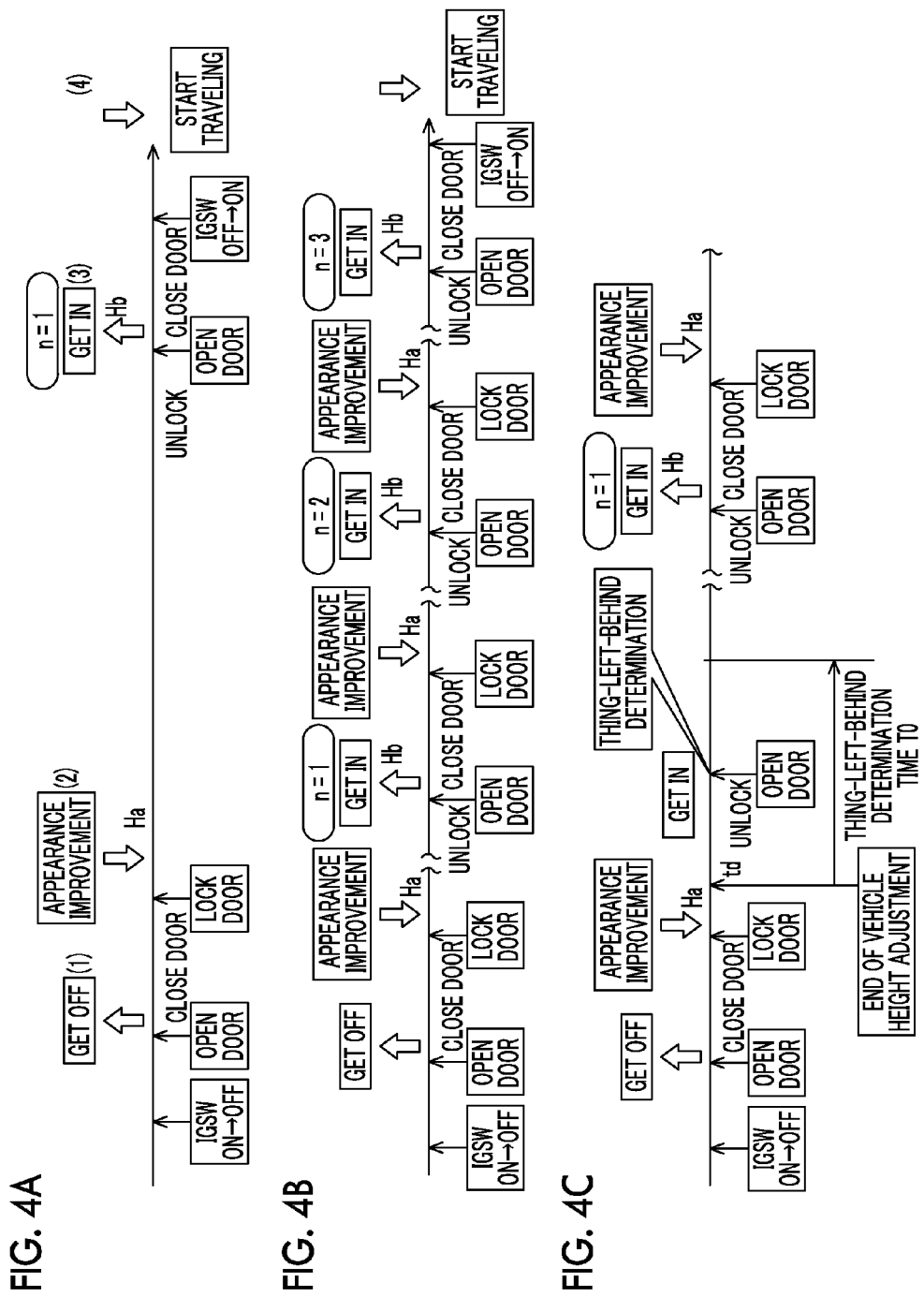

VEHICLE HEIGHT ADJUSTMENT SYSTEM

INCORPORATION BY REFERENCE

The disclosure of Japanese Patent Application No. 2015-231375 filed on Nov. 27, 2015 including the specification, drawings and abstract is incorporated herein by reference in its entirety.

BACKGROUND

1. Field of the Disclosure

The present disclosure relates to a vehicle height adjustment system.

2. Description of Related Art

According to the vehicle height adjustment system described in Japanese Patent Application Publication No. 3-70615 (JP 3-70615 A), the compressor works to supply air to the air cylinder to raise the vehicle height.

SUMMARY

The present disclosure reduces a decrease in the capacity of a battery that supplies power to a vehicle height adjustment system and thereby prevents the battery life from being shortened.

The first aspect of the present disclosure is a vehicle height adjustment system including: a vehicle height adjustment actuator provided for each wheel of a vehicle; a pressure medium intake and exhaust device configured to supply and exhaust a pressure medium to and from the vehicle height adjustment actuator; and a vehicle height adjustment unit configured to adjust a vehicle height by controlling the pressure medium intake and exhaust device, the vehicle height being a distance between the wheel and a vehicle body, wherein the vehicle height adjustment unit includes (a) a get-in-time vehicle height adjustment unit configured to adjust the vehicle height when a get-in estimation condition is satisfied, and (b) a number-of-times limitation unit configured to limit a number of times the vehicle height is adjusted by the get-in-time vehicle height adjustment unit within a set period to a number of times smaller than a set number of times. According to the above aspect, if the get-in estimation condition is satisfied, the vehicle height adjustment (hereinafter called get-in-time vehicle height adjustment) is performed to allow a person to get in the vehicle more easily. In addition to the case in which the get-in estimation condition is satisfied, the vehicle height adjustment may be performed if the get-off estimation condition is satisfied (get-off-time vehicle height adjustment). The vehicle height adjustment may also be performed to improve the appearance of the vehicle if the OFF state of the ignition switch lasts longer than the set time (appearance improvement vehicle height adjustment). Not only the number of times the get-in-time vehicle height adjustment is performed but also the number of times the get-off-time vehicle height adjustment or the appearance improvement vehicle height adjustment is performed may be limited.

The second aspect of the present disclosure is a vehicle height adjustment system including: a vehicle height adjustment actuator provided for each wheel of a vehicle; a pressure medium intake and exhaust device configured to supply and exhaust a pressure medium to and from the vehicle height adjustment actuator; and a vehicle height adjustment unit configured to adjust a vehicle height by controlling the pressure medium intake and exhaust device, the vehicle height being a distance between the wheel and a vehicle body, wherein the vehicle height adjustment unit includes a number-of-times limitation unit configured to limit a number of times the vehicle height adjustment is performed while an ignition switch is set to OFF to a number of times smaller than a set number of times.

According to the aspects described above, at least the number of times the vehicle height adjustment performed at a get-in time is limited. By limiting the number of times the get-in-time vehicle height adjustment is performed, the decrease in the capacity of the battery is reduced. As a result, the vehicle height adjustment system reduces the number of times the battery is charged and discharged and prevents the life of the battery from being shortened. Instead of limiting the number of times the vehicle height adjustment is performed based on the traveling state, the vehicle height adjustment system in the aspects described above limits the number of times the get-in-time vehicle height adjustment is performed, thus reducing the decrease in the capacity of the battery while maintaining the traveling stability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a diagram showing the vehicle height adjustment that is performed in a usual case while the ignition switch is set to OFF in the vehicle height adjustment system;

FIG. 4B is a diagram showing the vehicle height adjustment that is performed when the get-in estimation condition is satisfied a plurality of number of times while the ignition switch is set to OFF in the vehicle height adjustment system;

FIG. 4C is a diagram showing the vehicle height adjustment that is performed when a thing-left-behind determination is made while the ignition switch is set to OFF in the vehicle height adjustment system;

DETAILED DESCRIPTION OF EMBODIMENTS

A vehicle height adjustment system in one embodiment of the present disclosure is described in detail below with reference to the drawings. In the vehicle height adjustment system, air is used as the pressure medium.

Figure 1:
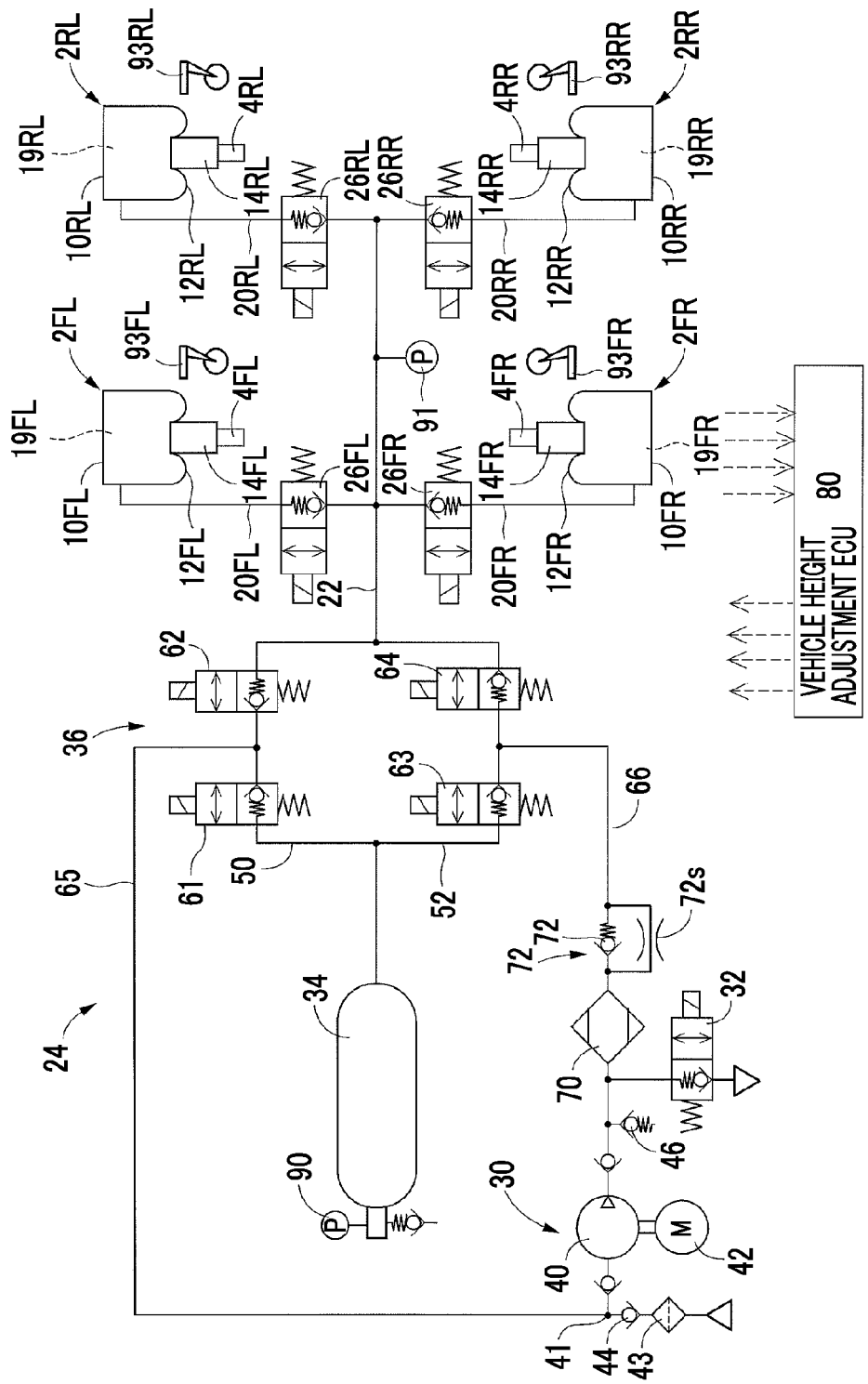
FIG. 1 is a circuit diagram showing a vehicle height adjustment system in a first embodiment of the present disclosure.

In a vehicle height adjustment system in a first embodiment, an air cylinder (2FL, 2FR, 2RL, 2RR), which works as an vehicle height adjustment actuator, and a shock absorber (4FL, 4FR, 4RL, 4RR) are provided in parallel to each other between the wheel-side component and the body-side component, not shown, for each of the front left, front right, rear left, and rear right wheels of the vehicle as shown in FIG. 1. Each of the shock absorbers, 4FL, 4FR, 4RL, and 4RR, includes a cylinder body provided on the wheel-side component and a piston provided on the body-side component. In the description below in this specification, the air cylinders 2 are distinguished by adding the symbols, FL, FR, RL, and RR, each indicating the position of the wheel, when there is a need to distinguish the cylinders by their positions. When there is no need to distinguish the cylinders by their positions, the symbols, FL, FR, RL, and RR, each indicating the position of the wheel, are omitted to generically indicate the cylinders. Each air cylinder 2 includes a chamber 10 that is the cylinder body provided on the body-side component, a diaphragm 12 fixed on the chamber 10, and an air piston 14 relatively movable in the vertical direction with respect to the diaphragm 12 and the cylinder body of the shock absorber 4. The interior of the air cylinder 2 is an air chamber 19 that is a pressure medium chamber. Air taken in and exhausted from the air chamber 19 causes the air piston 14 to relatively move in the vertical direction with respect to the chamber 10. This movement causes the cylinder body and the piston to relatively move in the vertical direction in the shock absorber 4, thereby changing the vehicle height that is the distance between the wheel-side component and the body-side component.

To the air chamber 19 of the air cylinder 2, an air intake and exhaust device 24, which works as a pressure medium intake and exhaust device, is connected via an individual passage 20 and a common passage 22. Each individual passage 20 has a vehicle height adjustment valve 26. The vehicle height adjustment valve 26, a normally closed solenoid valve, allows bidirectional airflow when opened and blocks airflow from the air chamber 19 to the common passage 22 when closed. When the pressure of the common passage 22 becomes higher than the pressure of the air chamber 19 by a predetermined pressure, the vehicle height adjustment valve 26 allows airflow from the common passage 22 to the air chamber 19.

The air intake and exhaust device 24 includes a compressor device 30, an exhaust valve 32, a pressure accumulator tank 34, and a switching device 36. The compressor device 30 includes a compressor 40, an electric motor 42 that drives the compressor 40, an intake valve 44 that is a check valve provided between an intake-side part 41, which is the intake side part of the compressor 40, and the atmosphere, and a relief valve 46 provided on the discharge side of the compressor 40. When the pressure of the intake-side part 41 of the compressor 40 becomes lower than the atmospheric pressure, air is taken in from the atmosphere by the compressor 40 via a filter 43 and the intake valve 44. When the discharge pressure of the compressor 40 becomes high, air is discharged into the atmosphere via the relief valve 46. The pressure accumulator tank 34, which stores compressed air, stores air compressed at a pressure higher than a predetermined initial pressure.

The switching device 36, provided among the common passage 22, the pressure accumulator tank 34, and the compressor device 30, switches the airflow direction among them. As shown in FIG. 1, the common passage 22 and the pressure accumulator tank 34 are connected by a first passage 50 and a second passage 52 provided in parallel to each other. Two solenoid operated circuit valves 61 and 62 are provided in series on the first passage 50, and two solenoid operated circuit valves 63 and 64 are provided in series on the second passage 52. A third passage 65 is connected between the two solenoid operated circuit valves 61 and 62 on the first passage 50 and is connected to the intake side of the compressor 40. A fourth passage 66, connected to the discharge side of the compressor 40, is connected between the two solenoid operated circuit valves 63 and 64 on the second passage 52. The solenoid operated circuit valves 61-64, normally closed valves, allow bidirectional airflow when opened, and block airflow from one side to the other when closed. When the pressure of the other side becomes higher than the pressure of one side by a predetermined pressure, the solenoid operated circuit valves 61-64 allow airflow from the other side to one side. The solenoid operated circuit valves 61 and 63, when closed, block air from being discharged from the pressure accumulator tank 34. The solenoid operated circuit valve 62, when closed, blocks air from being discharged from the common passage 22. The solenoid operated circuit valve 64, when closed, blocks air from being supplied to the common passage 22.

The exhaust valve 32 is a normally closed solenoid valve provided on the discharge side of the compressor 40 on the fourth passage 66. When the exhaust valve 32 is opened, the exhaust of air from the fourth passage 66 to the atmosphere is allowed. When the exhaust valve 32 is closed, the exhaust of air from the fourth passage 66 to the atmosphere is blocked but, when the atmospheric pressure becomes higher than the pressure of the fourth passage 66 by a predetermined pressure, the supply of air from the atmosphere to the fourth passage 66 is allowed. In a part that is on the fourth passage 66 and is nearer to the second passage than the exhaust valve 32, a drier 70 and a flow control mechanism 72 are provided in series. The flow control mechanism 72 includes a differential pressure valve 72$v$ and a choke 72$s$ provided in parallel to each other. The differential pressure valve 72$v$ blocks the airflow from the second passage side to the compressor side. When the pressure of the compressor side becomes equal to higher than the pressure of the second passage side by a predetermined setting pressure, the differential pressure valve 72$v$ allows the airflow from the compressor 40 to the second passage 52.

Figure 2:
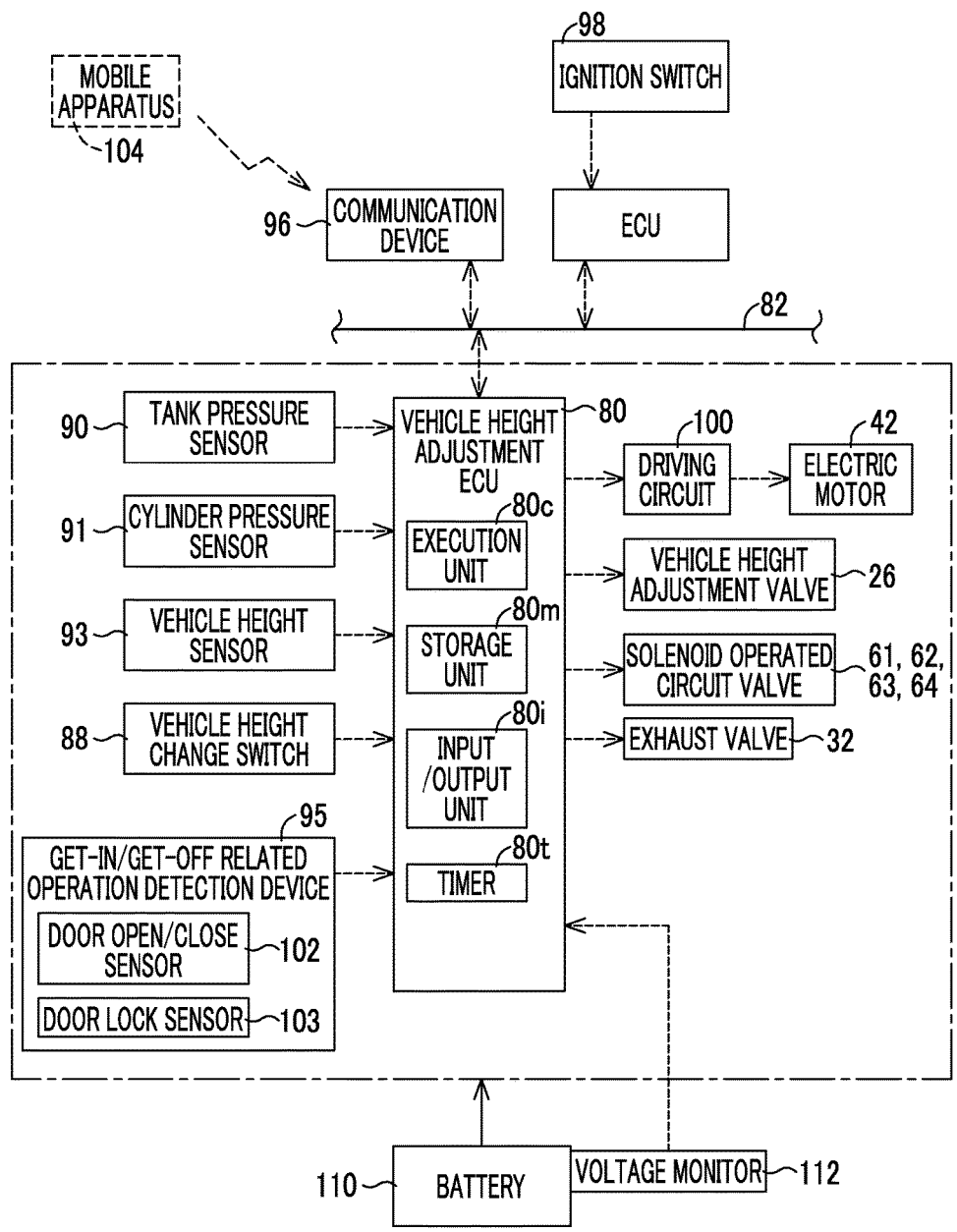
FIG. 2 is a conceptual diagram showing the surrounding components of a vehicle height adjustment ECU of the vehicle height adjustment system.

In this embodiment, the vehicle height adjustment system is controlled by a vehicle height adjustment ECU 80 composed mainly of a computer. As shown in FIG. 2, the vehicle height adjustment ECU 80 can communicate with a plurality of ECUs via a controller area network (CAN) 82. The vehicle height adjustment ECU 80 includes an execution unit 80c, a storage unit 80m, an input/output unit 80i, and a timer 80t. A vehicle height change switch 88, a tank pressure sensor 90, a cylinder pressure sensor 91, vehicle height sensors 93, and get-in/get-off related operation detection devices 95 are connected to the input/output unit 80i and, at the same time, a communication device 96 and an ignition switch 98 are connected to the input/output unit 80i via the CAN 82. In addition, the electric motor 42 is connected to the input/output unit 80i via a driving circuit 100 and, at the same time, the exhaust valve 32, vehicle height adjustment valve 26, and solenoid operated circuit valves 61-64 are connected to the input/output unit 80i. The vehicle height change switch 88 is operated by the driver to give an instruction to change the vehicle height to one of L(Low), N(Normal), and H(High). The tank pressure sensor 90 detects the pressure of air accumulated in the pressure accumulator tank 34 (hereinafter, sometimes abbreviated simply to "tank pressure"). The cylinder pressure sensor 91 is provided on the common passage 22. When any of the vehicle height adjustment valves 26 is open, the cylinder pressure sensor 91 detects the pressure of the air chamber 19 of the air cylinder 2 corresponding to the vehicle height adjustment valve 26 (wheel) that is open. When all vehicle height adjustment valves 26 are closed, the cylinder pressure sensor 91 detects the pressure of the air of the common passage 22. The vehicle height sensors 93 are provided, one for each of the front left, front right, rear left, rear right wheels, detect a deviation from the standard length of the distance (standard height) between the wheel-side component and the body-side component. The get-in/get-off related operation detection devices 95 are provided, one for each of a plurality of doors on the vehicle, to detect whether a get-in/get-off related operation is performed. Each of the get-in/get-off related operation detection devices 95 includes a door open/close sensor (courtesy lamp sensor) 102 that detects the open/closed state of the door and a door lock sensor 103 that detects the lock/unlock state of the door. Based on whether the door open/close operation or the door lock/unlock operation is performed, the get-in/get-off related operation detection device 95 estimates whether a person will get in, get off, or start the vehicle. The communication device 96 communicates with a mobile apparatus 104 of the driver in a predetermined communication area. Sometimes, the driver locks or unlocks a door via communication.

The vehicle height adjustment system in this embodiment can be powered by a battery 110. The voltage of the battery 110 is detected by a voltage monitor 112. The voltage monitor 112 is connected to the vehicle height adjustment ECU 80.

In the vehicle height adjustment system configured as described above, the vehicle height adjustment is performed as follows. While a vehicle travels, the target vehicle height is calculated for each of the front left, front right, rear left, and rear right wheels based on the traveling state, and the air intake and exhaust device 24 and the individual vehicle height adjustment valves 26 are controlled so that, for each wheel, the actual vehicle height approaches the target vehicle height. This control ensures the traveling stability of the vehicle. While the vehicle is stationary, the vehicle height adjustment is performed when it is estimated that a person will get off the vehicle, when it is estimated that a person will get in the vehicle, or when the appearance improvement condition is satisfied as will be described later. For example, the vehicle height adjustment is performed as shown in FIG. 4A. (1) When the vehicle stops and the door state is switched from the closed state to the open state (when the get-off estimation condition is satisfied), the vehicle height is raised based on the estimation that a person will get off. This vehicle height adjustment, which is done to enable the person to get off the vehicle easily, is called a get-off-time vehicle height adjustment. Although the ignition switch 98 is switched to OFF and then the door is opened in FIG. 4A, the door is opened and then the ignition switch 98 is switched to OFF in some cases. (2) After that, when the door is closed, the door is locked and, after that, a set time has elapsed, for example, when "the state in which the ignition switch 98 is set to OFF, the door is closed, and the door is locked lasts for the set time or longer", it is estimated that there is no intention to start the vehicle. In this case, the vehicle height is lowered to the set vehicle height Ha assuming that the appearance improvement condition is satisfied. This vehicle height adjustment, which is done to improve the vehicle appearance, is called an appearance improvement vehicle height adjustment. (3) After that, "when the door is unlocked" or "when the door is unlocked and then the door is opened", that is, when the door is unlocked or when the door is unlocked and then the door is opened in "the state in which the ignition switch 98 is set to OFF and the vehicle height is the set vehicle height Ha", the vehicle height is raised to the set vehicle height Hb based on the estimation that a person will get in the vehicle (get-in estimation condition is satisfied). This vehicle height adjustment, which is done to enable the person to get in the vehicle easily, is called a get-in-time vehicle height adjustment. Sometimes, a smart operation is performed to unlock the door by touching the doorknob. In this case, touching the doorknob may be a get-in estimation condition. (4) After that, when the ignition switch 98 is switched from OFF to ON and the traveling of the vehicle is started, the vehicle height is lowered to ensure traveling stability.

Figure 3A:
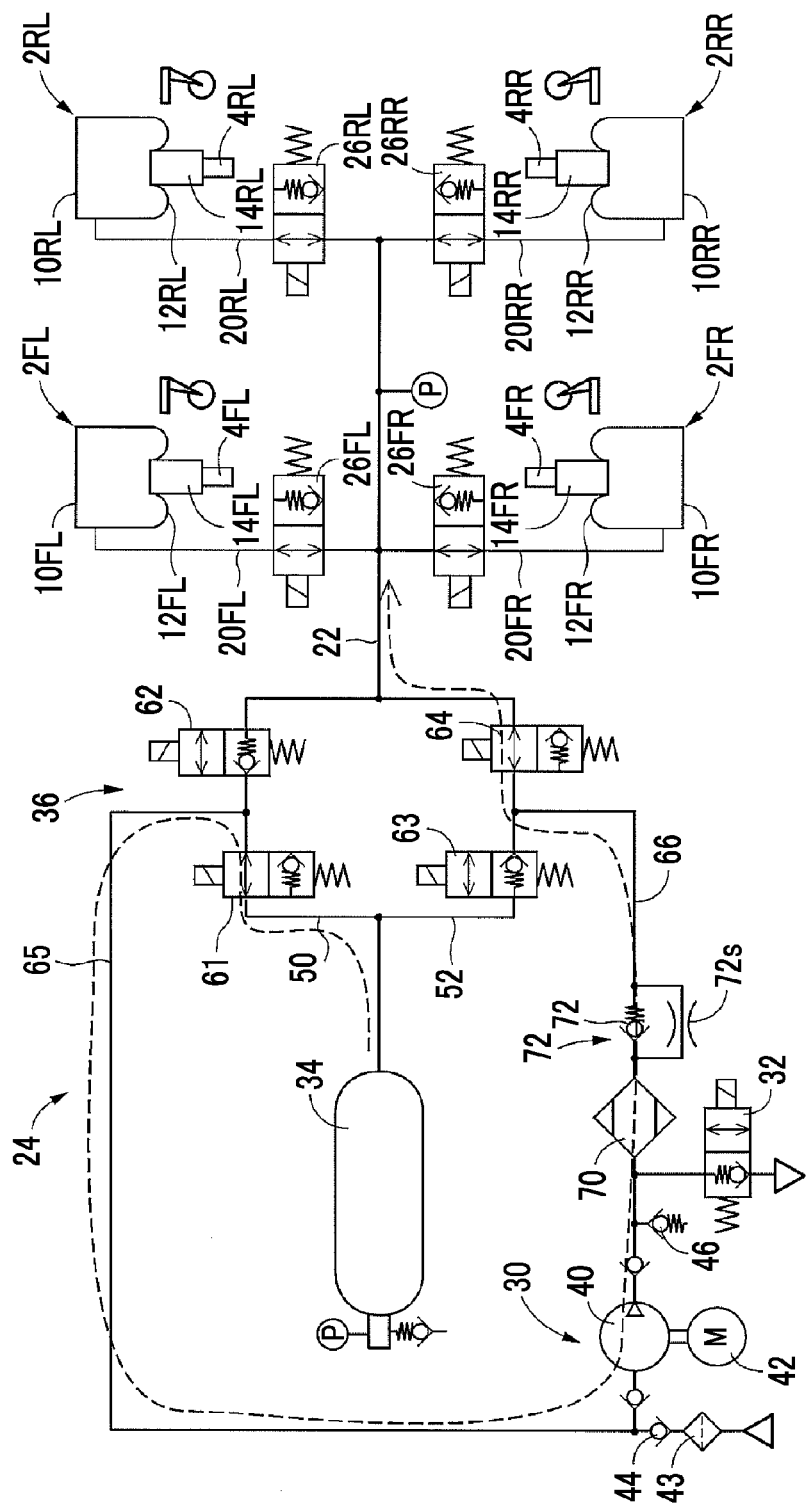
FIG. 3A is a diagram showing the state when air is supplied to the air cylinders of the vehicle height adjustment system.
Figure 3B:
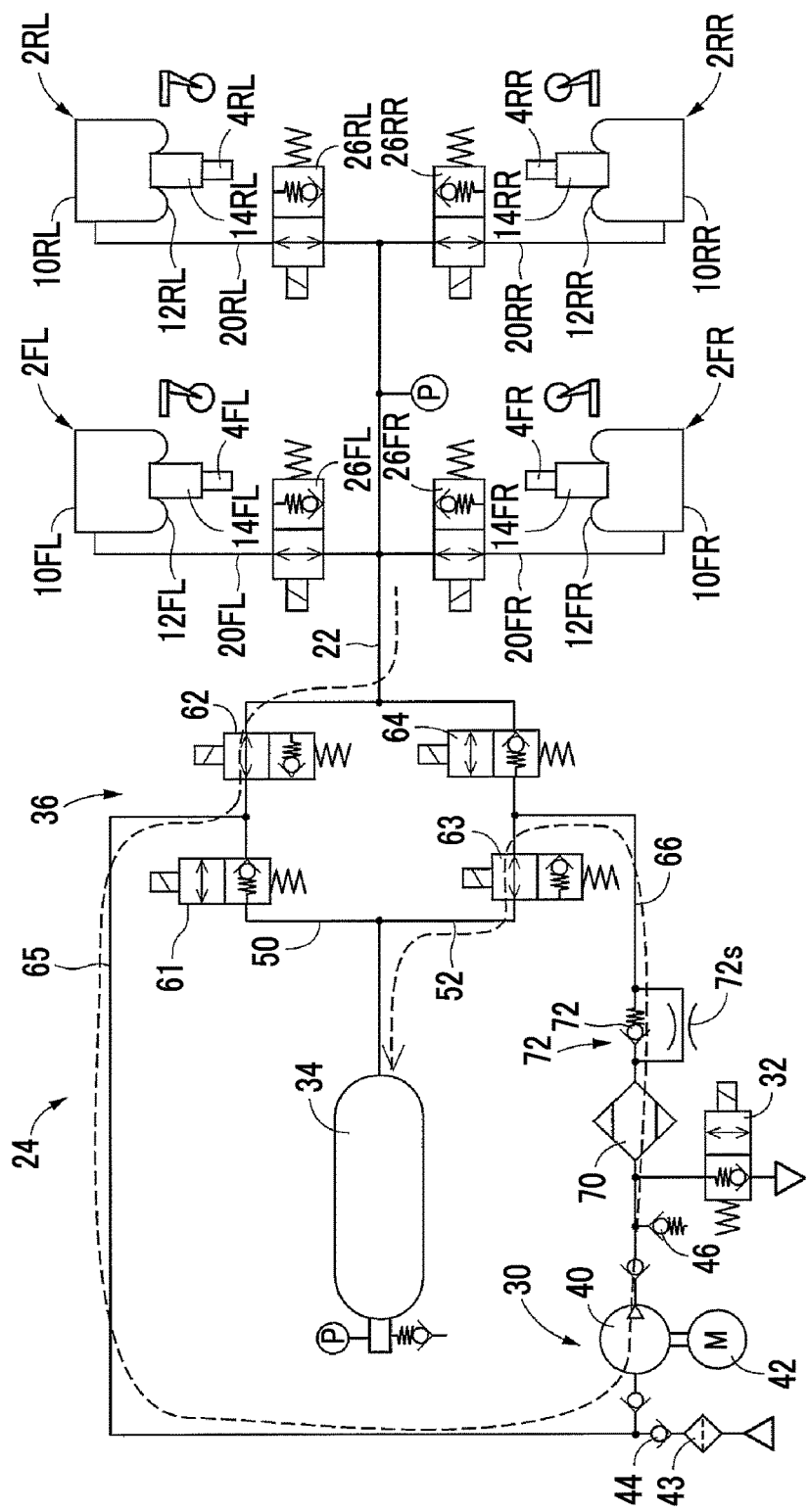
FIG. 3B is a diagram showing the state when air is exhausted from the air cylinders.

To raise the vehicle height while the vehicle is stationary, the electric motor 42 is driven to operate the compressor 40 so that the solenoid operated circuit valves 61 and 64 are opened, the solenoid operated circuit valves 62 and 63 are closed, and all individual vehicle height adjustment valves 26 are opened as shown in FIG. 3A. The air accumulated in the pressure accumulator tank 34 is supplied to the air chamber 19 of the air cylinder 2 of all wheels by the compressor 40. As a result, the vehicle height is raised for all wheels. To lower the vehicle height, the electric motor 42 is driven to operate the compressor 40 so that the solenoid operated circuit valves 61 and 64 are closed, the solenoid operated circuit valves 62 and 63 are opened, and all individual vehicle height adjustment valves 26 are opened as shown in FIG. 3B. The air in the air chamber 19 of the air cylinder 2 is taken in by the compressor 40 and is supplied to the pressure accumulator tank 34. The pressure accumulator tank 34, provided in this way, allows the air accumulated in the pressure accumulator tank 34 to be used to quickly adjust the vehicle height, thereby making it easier for a person to get in or get off the vehicle.

On the other hand, as shown in FIG. 4B, when the ignition switch 98 is set to OFF and then the appearance improvement vehicle height adjustment is performed to lower the vehicle height to the set vehicle height Ha and, after that, the operation (unlock door, open door) is detected, the get-in estimation condition is satisfied and the get-in-time vehicle height adjustment is performed. After that, when the operation (close door, lock door) is detected and the set time has elapsed, the appearance improvement vehicle height adjustment is performed. When a sequence of operations {(unlock door, open door), (close door, lock door)} is performed a plurality of number of times with the ignition switch 98 set to OFF in this way, the vehicle height is raised and lowered a plurality of number of times according to the door lock/unlock and open/closed state, with the result that the capacity of battery 110 is decreased. For example, when the ignition switch 98 is set to OFF and the vehicle height is the set vehicle height Ha, there is a case in which a sequence of operations {(unlock door, open door), (close door, lock door)} is performed to load luggage into the vehicle or in which a sequence of operations {(unlock door, open door), (close door, lock door)} is performed to take out luggage (thing left behind) from the vehicle.

The battery 110 is charged by a main battery separately mounted on the vehicle or by the operation of the engine. In either case, the battery 110 is not charged while the ignition switch 98 is set to OFF but is charged after the ignition switch 98 is set to ON. However, if the capacity of the battery 110 is decreased while the ignition switch 98 is set to OFF, it takes long to charge the battery 110 after the ignition switch 98 is set to ON. Therefore, before the battery 110 is charged sufficiently to the {predetermined charging level (for example, to a level close to the full charging level)}, the vehicle height adjustment is sometimes performed and, as a result, the battery is discharged. This results in repeated charging and discharging, sometimes shortening the life of the battery 110. In addition, the smaller the capacity of the battery 110 is when the ignition switch 98 is set to ON, in other words, the larger the power consumption amount of the battery 110 is while the ignition switch 98 is set to OFF, the more frequently is charging and discharging repeated in many cases. One possible method to address this problem is to prevent the vehicle height adjustment from being performed until the ignition switch 98 is set to ON and the vehicle starts traveling, if the get-in estimation condition is satisfied and the get-in-time vehicle height adjustment is performed on the assumption that the door is unlocked/locked and the door is opened/closed according to the pattern shown in FIG. 4A. This method can reduce the decrease in the capacity of the battery 110 while the ignition switch 98 is set to OFF. However, this method generates another problem that, when the operation (unlock door, open door) is performed to take out a thing-left-behind from the vehicle, the get-in-time vehicle height adjustment is performed but the vehicle's appearance becomes bad because the vehicle height remains high thereafter.

Figure 5A:
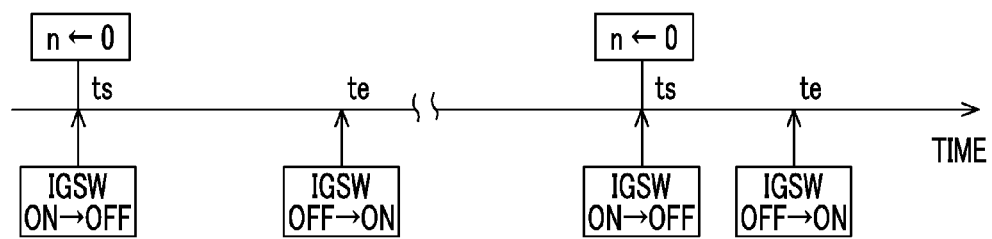
FIG. 5A is a diagram showing the times at which the count value of a counter, provided for counting the number of times the vehicle height adjustment is performed, is reset.
Figure 5B:
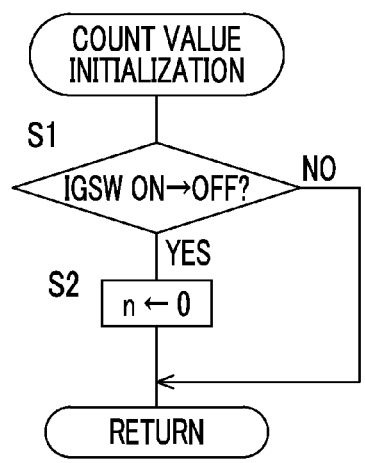
FIG. 5B is a flowchart showing a count value initialization program stored in the storage unit of the vehicle height adjustment ECU.

In view of the foregoing, while the ignition switch 98 is set to OFF, this embodiment allows the get-in-time vehicle height adjustment two or more times but limits the number of times (n) the get-in-time vehicle height adjustment is performed to the number of times smaller than Nth. [1] The number of times the get-in-time vehicle height adjustment is performed is limited within one OFF period. One OFF period refers to the period from the point in time ts, when the ignition switch 98 is switched from ON to OFF, to the point in time te when the ignition switch 98 is switched from OFF to ON as shown in FIG. 5A. Therefore, the count value n of the counter, which counts the number of times the get-in-time vehicle height adjustment is performed, is set to 0 each time the ignition switch 98 is switched from ON to OFF. The count value initialization program shown in FIG. 5B is executed at each predetermined set time. In step 1 (hereinafter, step 1 is abbreviated as S1. The other steps are denoted in the same way), it is determined whether the ignition switch 98 is switched from ON to OFF. If the ignition switch 98 is switched to OFF, the determination result is YES. In step S2, the count value (n) of the counter, which counts the number of times the get-in-time vehicle height adjustment is performed, is set to 0.

[2] The number of times the get-in-time vehicle height adjustment is performed is limited. When the vehicle stops, the get-off-time vehicle height adjustment and the appearance improvement vehicle height adjustment are performed as described above. When the vehicle stops, there is a high possibility that a person will actually get off the vehicle and there is a high requirement for performing the get-off-time vehicle height adjustment and the appearance improvement vehicle height adjustment. On the other hand, if the get-in estimation condition is satisfied after the appearance improvement vehicle height adjustment is performed, there is a possibility that the operation (unlock door, open door) is performed to load luggage into, or to take out luggage from, the vehicle as described above and, in this case, there is sometimes no need to perform the vehicle height adjustment. Therefore, it is appropriate to limit the number of times the get-in-time vehicle height adjustment is performed. In addition, because the appearance improvement vehicle height adjustment is performed in most cases after the get-in-time vehicle height adjustment is performed to load luggage into, or to take out a thing-left-behind from, the vehicle, the number of times the appearance improvement vehicle height adjustments is performed is also limited in most cases if the number of times the get-in-time vehicle height adjustments is performed is limited. Considering these factors, if the get-in estimation condition is satisfied after the get-off vehicle height adjustment is performed and then the appearance improvement vehicle height adjustment is performed while the ignition switch 98 is set to OFF, the number of times the get-in-time vehicle height adjustment is performed and the number of times the appearance improvement vehicle height adjustment is performed are limited.

Figure 7:
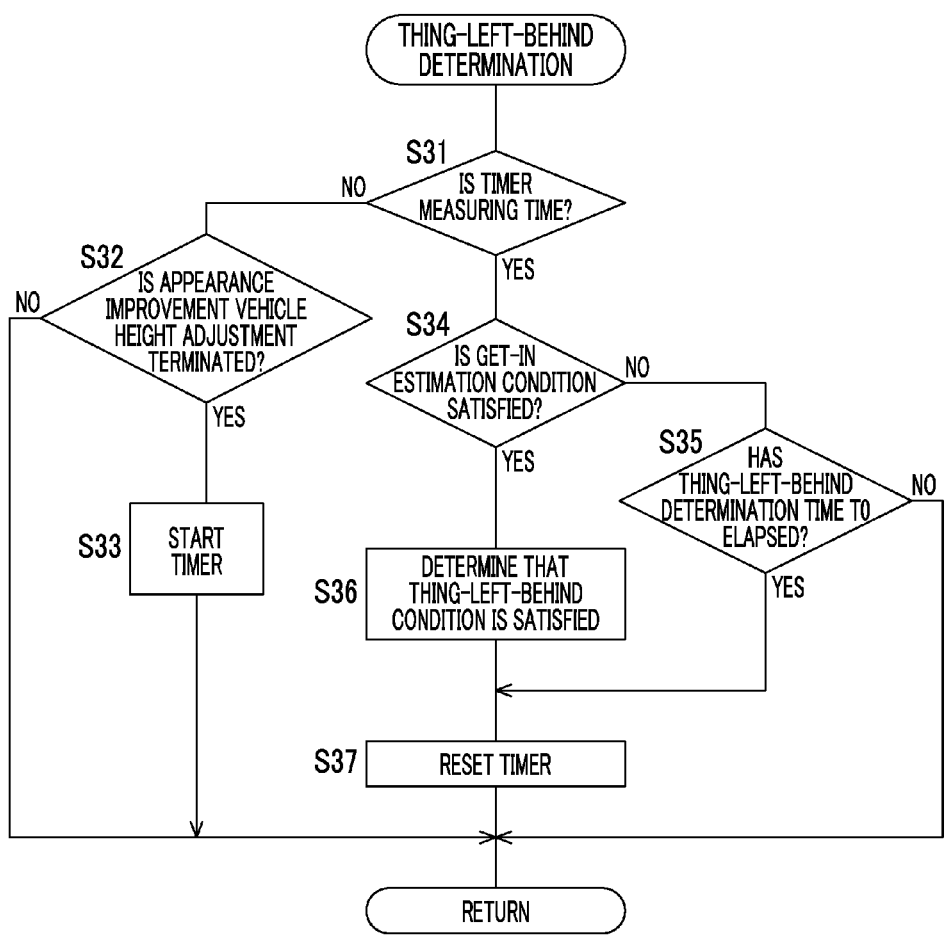
FIG. 7 is a flowchart showing a thing-left-behind determination program stored in the storage unit.

[3] If the get-in estimation condition is satisfied, the number of times the get-in-time vehicle height adjustment is performed is counted. However, if the get-in estimation condition is satisfied but this condition is satisfied to take out a thing-left-behind from the vehicle, the number of times the get-in-time vehicle height adjustment is performed is not counted. For example, as shown in FIG. 4C, if the get-in estimation condition (unlock door, open door) is satisfied during the period from the time td, at which the appearance improvement vehicle height adjustment is terminated, until the time the thing-left-behind determination time T0 (pre-set time) elapses (that is, if the thing-left-behind condition is satisfied), it is estimated that the get-in estimation condition is satisfied to allow a person to take out a thing-left-behind from the vehicle. In this case, neither the get-in-time vehicle height adjustment is performed nor the number of times is counted. The thing-left-behind determination program shown in the flowchart in FIG. 7 is executed at each pre-defined set time. In S31, it is determined whether the timer 80*t* is measuring the thing-left-behind determination time T0. If the timer 80*t* is not measuring the thing-left-behind determination time T0, it is determined in S32 whether the appearance improvement vehicle height adjustment is terminated. If the appearance improvement vehicle height adjustment is being performed or if the appearance improvement vehicle height adjustment is not performed, the determination result is NO. In this case, S31 and S32 are executed repeatedly. If the appearance improvement vehicle height adjustment is terminated after repeated executions, the timer starts the measurement of time (thing-left-behind determination time) in S33. Next, because the timer 80*t* is measuring the time, the determination result of S31 is YES and, in S34, it is determined whether the get-in estimation condition is satisfied. If the get-in estimation condition is not satisfied, it is determined in S35 whether the thing-leftbehind determination time T0 has elapsed. Before the thing-left-behind determination time T0 elapses, S31, S34, and S35 are executed repeatedly. If the get-in estimation condition is satisfied, the determination result of S34 is YES and then it is determined in S36 that the get-in estimation condition is satisfied to allow a person to take out a thing-left-behind from the vehicle, that is, it is determined that the thing-left-behind condition is satisfied. In 37, the timer is reset. In addition, if the timer is measuring the time and if the thing-left-behind determination time T0 has elapsed before the get-in estimation condition is satisfied, the timer is reset in S37. The thing-left-behind flag may be turned ON when the door is unlocked via the communication device 96 while the mobile apparatus 104 is still in the communication area.

[4] The set number of times Nth may be determined based on the capacity of the battery 110 and its degree of degradation. The state of the battery 110 may be acquired based on the voltage of the battery 110. When the vehicle height adjustment is performed while the ignition switch 98 set to ON, the voltage is detected when the get-off-time vehicle height adjustment or the appearance improvement vehicle height adjustment is performed and, based on the detected voltage, the capacity of the battery 110 and its degree of degradation are acquired. For example, it is considered that the capacity is smaller when the voltage of the battery 110 is low than when the voltage of the battery 110 is high. It is considered that, when the power of the battery 110 is used, the capacity is smaller and the degree of degradation is higher when the voltage drop gradient is high than when the voltage drop gradient is low. The set number of times Nth may be set to a value that is smaller when the capacity of the battery 110 is small and the degree of degradation is high than when the capacity is large and the degree of degradation is low. The set number of times Nth is three or larger (the allowable number of times the get-in-time vehicle height adjustments is performed is two or larger). If the get-in-time vehicle height adjustment is allowed at least two times and, in this case, if the get-in-time vehicle height adjustment is performed to allow a person to take out a thing-left-behind from the vehicle, the appearance improvement vehicle height adjustment is performed later to prevent the appearance of the vehicle from getting worse. In addition, the next time the get-in estimation condition is satisfied, the get-in-time vehicle height adjustment is performed to allow a person to get in or get off the vehicle more easily. The set number of times Nth may be a fixed value.

[5] The target vehicle height H* at the get-in-time vehicle height adjustment time may be a value that becomes smaller as the number of times the vehicle height adjustment is performed is increased. For example, the target vehicle height H*(n) may be determined as shown by the expression below, based on the number of times (n) the get-in estimation condition is satisfied from the time the ignition switch 98 is set to OFF and on the set vehicle height Hb.

$$H^*(n)=Hb \cdot \{1-(n-1)/Nth\}$$

In addition, the vehicle height lowering amount {H*(n)–Hb} at the appearance improvement vehicle height adjustment time may be reduced by reducing the target vehicle height H* at the get-in-time vehicle height adjustment time. Setting the target vehicle height H* at the get-in-time vehicle height adjustment time to a value smaller than the set vehicle height Hb in this way reduces the decrease in the capacity of the battery 110. In other words, if the power consumption that is allowed while the ignition switch 98 is set to OFF is controlled so that the power consumption remains almost the same throughout the period, the set number of times Nth may be increased by reducing the target vehicle height H*. In addition, the target vehicle height H*(n) is reduced as the number of times increases. As a result, even if the number of times the get-in-time vehicle height adjustment is performed is increased, the amount of decrease in the capacity of the battery 110, associated with the increase in the number of times, may be reduced. The target vehicle height H*(n) may also be determined based on the state of the battery 110. For example, the target vehicle height H* may be a value that is smaller when the capacity of the driving circuit 100 is small and the degree of degradation is high than when the capacity is large and the degree of degradation is low. Setting the value of the target vehicle height H* in this way eliminates the possibility that the capacity of the battery 110 becomes too small, preventing an increase in the number of repetitions of charging and discharging after the ignition switch 98 is set to ON.

Figure 6:
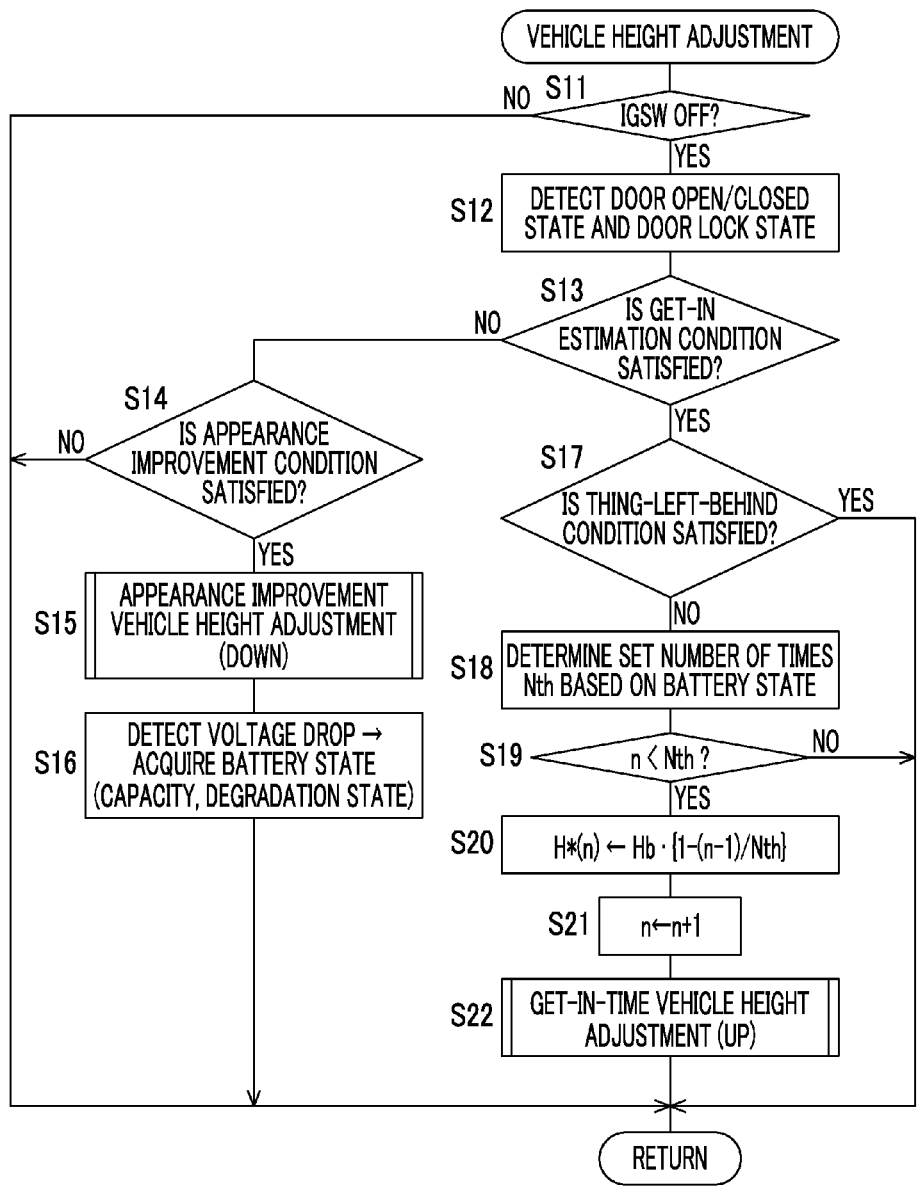
FIG. 6 is a flowchart showing a vehicle height adjustment program stored in the storage unit of the vehicle height adjustment ECU.

The vehicle height adjustment program in FIG. 6 is executed at each pre-defined set time. In S11, it is determined whether the ignition switch 98 is set to OFF. If the ignition switch 98 is set to OFF, the detection values of the door lock sensor 103 and the door open/close senor 102 are acquired in S12 and, in S13, it is determined whether the get-in estimation condition is satisfied. If the get-in estimation condition is not satisfied, it is determined in S14 whether the appearance improvement condition is satisfied. After that, while the ignition switch 98 is set to OFF, it is determined whether the get-in estimation condition is satisfied and whether the appearance improvement condition is satisfied and, if neither is satisfied, S11 to S14 are executed repeatedly. If the appearance improvement condition is satisfied after repeated executions, the determination result of S14 is YES. In this case, the appearance improvement vehicle height adjustment is performed in S15 and, then, the voltage and the voltage drop gradient of the battery 110 are acquired in S16 to acquire the state of the battery 110 (Here and in the description below, the state refers to the capacity of the battery 110 and its degree of degradation). If the get-in estimation condition is satisfied, it is determined in S17 whether the thing-left-behind condition is satisfied. If the thing-left-behind condition is not satisfied, the state of the battery 110 acquired in S16 is read in S18 and, based on the acquired state, the set number of times Nth is determined. In S19, it is determined whether the number of times the get-in-time vehicle height adjustment is performed (number of times the get-in estimation condition is satisfied) (n) is smaller than the set number of times Nth. If the number of times the get-in-time vehicle height adjustment is performed is smaller than the set number of times Nth, the target vehicle height H*(n) is determined in S20 based on the expression given above and, in S21, the count value n is incremented by one. After that, in S22, the get-in-time vehicle height adjustment is performed to raise the vehicle height so that the actual vehicle height approaches the target vehicle height H*(n). On the other hand, if the number of times the get-in-time vehicle height adjustment is performed (n) is equal to or larger than the set number of times Nth, the determination result of S19 is NO, in which case S20 to S22 are not executed. This means that, even if the get-in estimation condition is satisfied, the vehicle height adjustment is not performed. In addition, if the get-in estimation condition is satisfied but if the thing-left-behind condition is satisfied, the determination result of S17 is YES. In this case, too, the get-in-time vehicle height adjustment is not performed and therefore the number of times is not counted.

In this embodiment, because the number of times the get-in-time vehicle height adjustment is performed while the ignition switch 98 is set to OFF is limited as described above, the decrease in the capacity of the battery 110 can be reduced. This reduction in the decrease in the capacity of the battery 110, in turn, reduces the number of times charging and discharging is repeated after the ignition switch 98 is set to ON and prevents the battery 110 from being degraded and its life from being shortened. In addition, if the get-in estimation condition is satisfied but if the result of the thing-left-behind determination is YES, the vehicle height adjustment is not performed and, therefore, unnecessary vehicle height adjustment is not usually performed. This also reduces the decrease in the capacity of the battery 110. In addition, by reducing the number of operations of the air intake and exhaust device 24, the number of operations of the components of the air intake and exhaust device 24 (compressor 40, solenoid operated circuit valves 61-64) can be reduced. This reduction in the number of operations prevents the life of the components from being shortened. In addition, in this embodiment, the get-in-time vehicle height adjustment may be performed a plurality of number of times while the ignition switch 98 is set to OFF. Therefore, even if the door is unlocked and is opened to load luggage in the vehicle and then the get-in-time vehicle height adjustment is performed, this embodiment allows a person to get in, or get off, the vehicle easily while preventing the vehicle's appearance from becoming bad.

In this embodiment, the vehicle height adjustment device is configured by the vehicle height adjustment ECU 80, communication device 96, get-in/get-off related operation detection devices 95, vehicle height sensor 92, electric motor 42, individual vehicle height adjustment valves 26, exhaust valve 32, solenoid operated circuit valves 61-64, and voltage monitor 112. The vehicle height adjustment ECU 80, one of the components described above, stores the vehicle height adjustment program represented by the flowchart in FIG. 6. The get-in-time vehicle height adjustment unit is configured by the part for storing, and the part for executing, S11-S13 and S17-S22 in the flowchart in FIG. 6. The number-of-times limitation unit is configured by the part for storing, and the part for executing, S13, S17, S18, and S19 of the vehicle height adjustment program represented by the flowchart in FIG. 6. The number-of-times determination unit is configured by the part for storing, and the part for executing, S18 that is one of the steps of the number-of-times limitation unit. The count unit is configured by the part for storing, and the part for executing, S13, S17, and S19. In addition, the operation amount determination unit is configured by the part for storing, and the part for executing, S20 that is included in the get-in-time vehicle height adjustment unit and is one of the steps of the vehicle height adjustment program represented by the flowchart in FIG. 6. The thing-left-behind determination unit is configured by the part for storing, and the part for executing, S17 (S31-S38).

A second embodiment is described below. In the second embodiment, the target vehicle height H*(n) need not necessarily be a variable value but may be the set vehicle height Hb that is a fixed value. The set number of times Nth may also be a fixed value. In addition, the thing-left-behind determination need not necessarily be performed.

Figure 8:
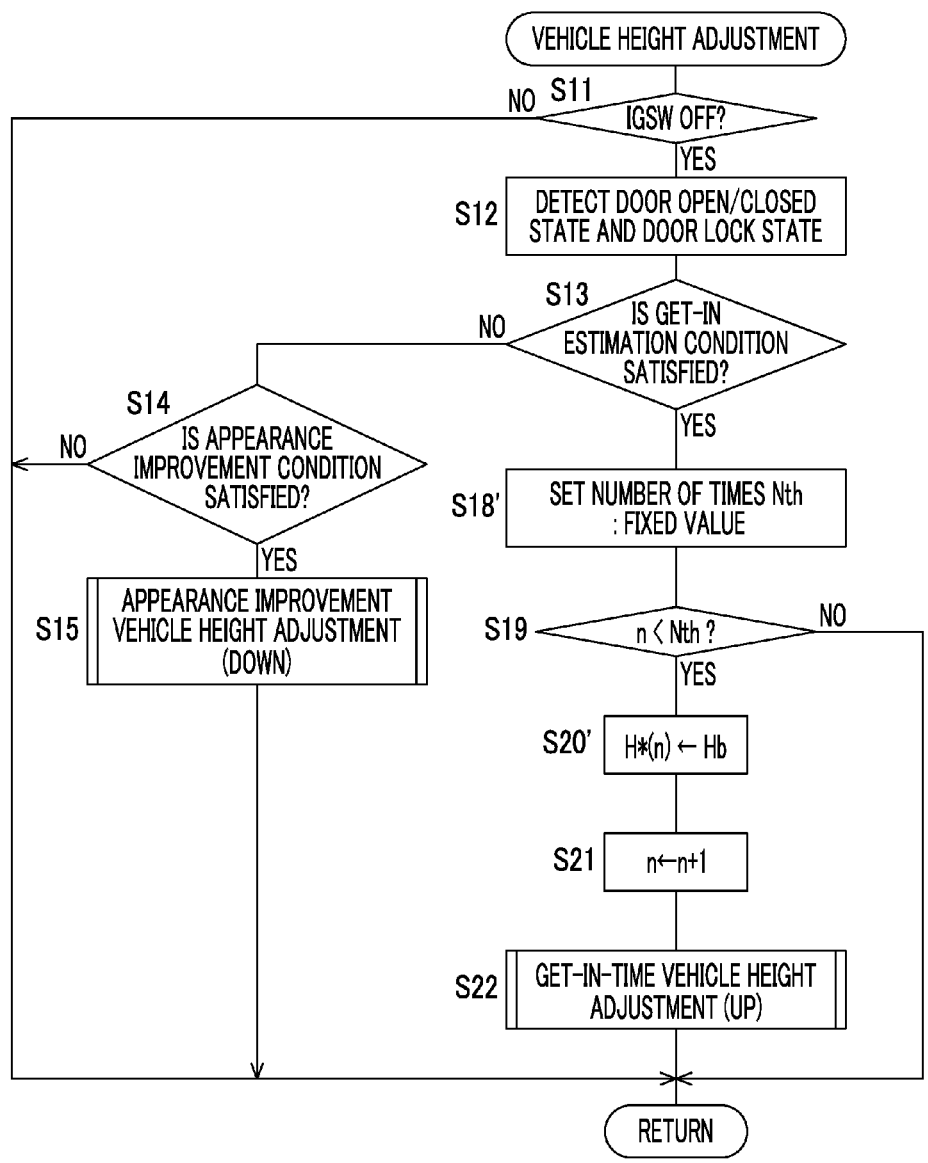
FIG. 8 is a flowchart showing a vehicle height adjustment program stored in the storage unit of a vehicle height adjustment ECU of a vehicle height adjustment system in a second embodiment of the present disclosure.

One example in that case is shown in the flowchart in FIG. 8. In the vehicle height adjustment program represented by the flowchart in FIG. 8, the same step number is given to a step in which the processing similar to that in the first embodiment is performed and the detailed description of that step will be omitted. If the get-in estimation condition is satisfied in S13 in the vehicle height adjustment program, the set number of times Nth is set to a fixed value in S18'. After that, in S19, it is determined whether the count value (n) is smaller than the set number of times Nth and, if the count value (n) is smaller, the target vehicle height H*(n) is set to the fixed value Hb in S20'. In S21, the count value is incremented by one and, in S22, the get-in-time vehicle height adjustment is performed. Because the state of the battery 110 is not detected, the step in S16 is omitted. As in the first embodiment, the decrease in the capacity of the battery 110 can be reduced in the second embodiment and, after the ignition switch 98 is set to ON, the repetition of charging and discharging can be reduced to prevent the life of the battery 110 from being shortened. In addition, because a fixed value is used for the set number of times Nth and for the target vehicle height H*, the calculation is made easier.

Figure 9A:
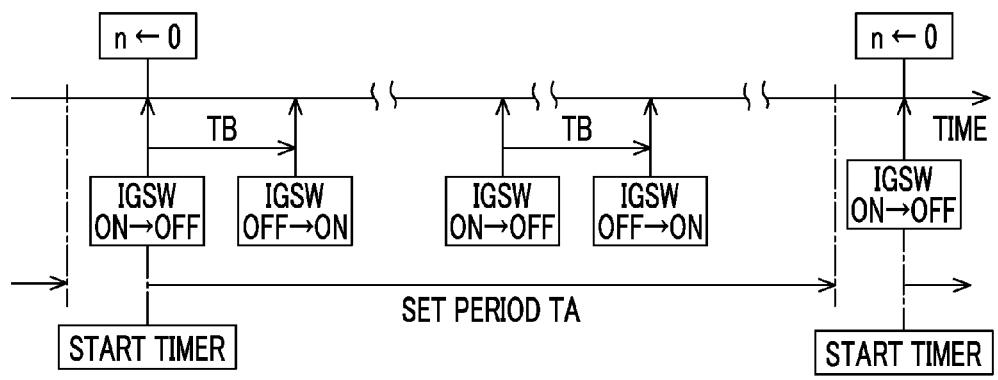
FIG. 9A is a diagram showing the times at which the count value of a counter, provided for counting the number of times the vehicle height adjustment is performed, is reset in a vehicle height adjustment system in a third embodiment of the present disclosure.
Figure 9B:
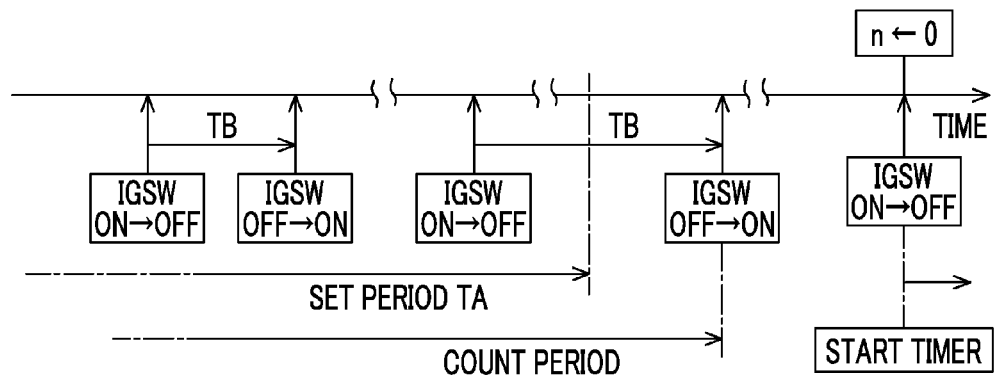
FIG. 9B is a diagram showing a period during which the number of times the vehicle height adjustment is performed is counted in the vehicle height adjustment system in the third embodiment of the present disclosure.

A third embodiment is described below. In the third embodiment, a set period TA, during which the number of times the vehicle height adjustment is performed is limited, includes a plurality of OFF periods during which the ignition switch 98 is set to OFF. The set period TA is, for example, one week or ten days. As shown in FIG. 9A, the ignition switch 98 is usually set to OFF a plurality number of times during the set period TA. Therefore, in each period TB of the plurality number of OFF periods (multiple OFF periods), the number of times (n) the vehicle height adjustment is performed is counted and it is required that the accumulated value of these counts be smaller than the set number of times Nth. If the ignition switch 98 is placed in OFF when the set period TA has elapsed as shown in FIG. 9B, the counting of the number of times the vehicle height adjustment is performed is continued until the next time the ignition switch 98 is set to ON. In this case, the period to the next time the ignition switch 98 is set to ON is a period in which the number of times the vehicle height adjustment is performed is limited. This is because, if the count value is reset during the period in which the ignition switch 98 is set to OFF and, after that, the vehicle height adjustment is allowed, it is difficult to reduce the decrease in the capacity of the battery 110.

Figure 10:
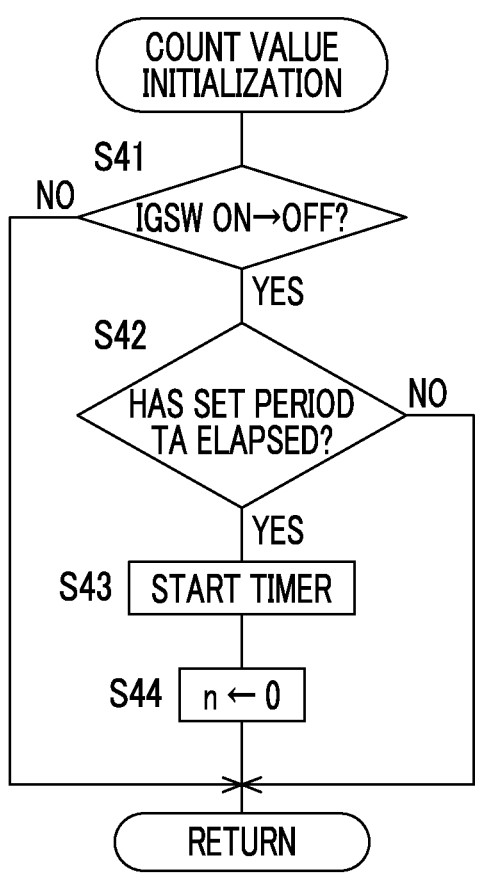
FIG. 10 is a flowchart showing a count value initialization program stored in the storage unit of a vehicle height adjustment ECU of the vehicle height adjustment system.

The count value initialization program represented by the flowchart in FIG. 10 is executed at each set time. In S41, it is determined whether the ignition switch 98 is switched from ON to OFF and, if the ignition switch 98 is switched to OFF, it is determined in S42 whether the set period TA has elapsed. Before the set period TA elapses, the timer continues to measure the time and the count value of the counter is not cleared. Before the set period TA elapses, if the get-in estimation condition is satisfied and the vehicle height adjustment is performed while the ignition switch 98 is set to OFF, the number of times the vehicle height adjustment is performed is counted. If the ignition switch 98 is set to OFF a plurality of number of times, the count values, each indicating the number of times the vehicle height adjustment is performed in each period TB, are accumulated. On the other hand, after the set period TA has elapsed, the timer starts measurement in S43 and, in S44, the count value is set to 0. When the ignition switch 98 is switched from ON to OFF after the set period TA has elapsed, the count value (n) is cleared. In this embodiment, the accumulated value of the counts, each of which indicates the number of times the vehicle height adjustment is performed in each OFF period TB, is limited to a value smaller than the set number of times Nth. In this way, this embodiment reduces the decrease in the capacity of the battery 110 and prevents its life from being shortened.

The structure of the vehicle height adjustment system is not limited to the system described in the embodiments above. For example, the structure of the vehicle height adjustment system may be applied broadly to a system in which the get-in-time vehicle height adjustment is performed or to a system in which the vehicle height adjustment is performed while the ignition switch is set to OFF. The present disclosure may be implemented in a mode in which various changes and improvements are added based on the knowledge of those skilled in the art.

In the aspect described above, the set period may be a period from a time an ignition switch of the vehicle is switched from ON to OFF to a time the ignition switch is switched from OFF to ON. For example, when the door is unlocked and then the state of the door is changed from the closed state to the open state, or when the door is unlocked, while the ignition switch is set to OFF, the get-in estimation condition is satisfied and it is estimated that a person will get in the vehicle. If the get-in estimation condition is satisfied, the get-in-time vehicle height adjustment is performed. However, if the get-in-time vehicle height adjustment is performed but if a person does not get in the vehicle, the appearance improvement vehicle height adjustment is performed thereafter. In this way, the get-in estimation condition is thought of as a trigger for the vehicle height adjustment while the ignition switch is set to OFF. Therefore, if the number of times the get-in-time vehicle height adjustment is performed is limited while the ignition switch is set to OFF, the number of times the vehicle height adjustment is performed while the ignition switch is set to OFF can be limited. In addition, if the number of times the get-in-time vehicle height adjustment is performed is limited, the number of times the appearance improvement control is performed is also limited.

In the aspect described above, the set period may include a plurality of periods, each being a period from a time an ignition switch of the vehicle is switched from ON to OFF to a time the ignition switch is switched from OFF to ON. It is required that the accumulated number of times the get-in-time vehicle height adjustment is performed in one OFF period be a number of times smaller than the set number of times. For example, the set period may be three days, seven days, or ten days. During the set period, the ignition switch is switched from ON to OFF and from OFF to ON a plurality number of times in many cases. If the ignition switch is placed in OFF when the set period has elapsed, the number of times the vehicle height adjustment is performed is limited until the ignition switch is switched to ON. This is because, if the set period has elapsed while the ignition switch is set to OFF and, after that, the vehicle height adjustment is allowed, the effect of reducing the decrease in the capacity of the battery cannot be fully achieved.

In the aspect described above, the vehicle height adjustment system may operate on power supplied from a battery and the number-of-times limitation unit may include a number-of-times determination unit configured to determine the set number of times based on a state of the battery. The state of the battery refers to the capacity of the battery and its degree of degradation. The state of the battery can be acquired based on the voltage of the battery and the voltage drop gradient. For example, the set number of times may be set smaller when the capacity of the battery is small or the degree of degradation is high than when the capacity of the battery is large or the degree of degradation is low. Because the battery cannot be charged while the ignition switch is set to OFF, the battery is charged after the ignition switch is set to ON. In this case, if the capacity of the battery becomes too small while the ignition switch is set to OFF, it takes long to charge the battery to a pre-set level after the ignition switch is set to ON. Therefore, in some cases, the vehicle height adjustment is performed before the battery is charged to the pre-set level and, as a result, the battery is discharged, with the result that charging and discharging is repeated. The larger the power consumption amount of the battery is while the ignition switch is set to OFF, in other words, the smaller the capacity of the battery is when the ignition switch is set to ON, the more frequently is charging and discharging repeated in many cases. In addition, if charging and discharging is repeated when the degree of degradation of the battery is high, the battery is further degraded and its life is shortened. On the other hand, because the decrease in the capacity of the battery is reduced while the ignition switch is set to OFF, the vehicle height adjustment system described here eliminates the possibility that charging and discharging is performed repeatedly after the ignition switch is set to ON or reduces the number of times charging and discharging is repeated, thus preventing the battery life from being shortened.

In the aspect described above, the set number of times may be a value equal to or larger than three.

In the aspect described above, the vehicle height adjustment system may operate on the power supplied from the battery and the get-in-time vehicle height adjustment unit may include an operation amount determination unit configured to determine an operation amount of the vehicle height adjustment actuator based on the state of the battery. By reducing the operation amount, that is, the amount of vehicle height adjustment, when the capacity of the battery is small or when the degree of degradation is high, the vehicle height adjustment system eliminates the possibility that the capacity of battery becomes too small and, after the ignition switch is set to ON, eliminates the possibility that charging and discharging is performed repeatedly. In addition, if the power consumption that is allowed while the ignition switch is set to OFF is controlled so that the power consumption remains almost the same throughout the period, the set number of times may be increased by reducing the operation amount.

In the aspect described above, the get-in-time vehicle height adjustment unit may include an operation amount control unit configured in such a way that an operation amount of the vehicle height adjustment actuator is smaller as a number of times vehicle height adjustment is performed is larger, the vehicle height adjustment being performed when the get-in estimation condition is satisfied.

In the aspect described above, the number-of-times limitation unit may include a count unit configured to count the number of times when the get-in estimation condition is satisfied.

In the aspect described above, the number-of-times limitation unit may be configured not to count the number of times when a thing-left-behind condition is satisfied. If the thing-left-behind condition is satisfied, it is estimated that the operation (unlock door, open door) is performed, not to allow a person to get in the vehicle, but to take out a thing-left-behind from the vehicle. Therefore, there is no great necessity for vehicle height adjustment and the get-in-time vehicle height adjustment is not performed.

In the aspect described above, the get-in-time vehicle height adjustment unit may include a thing-left-behind determination unit configured to determine that the thing-left-behind condition is satisfied when the get-in estimation condition is satisfied before set time elapses from a time a previous vehicle height adjustment is terminated.

In the aspect described above, the vehicle height adjustment system may further include a communication device that carries out communication with a mobile apparatus, and the get-in-time vehicle height adjustment unit may include a communication-dependent thing-left-behind determination unit configured to determine the thing-left-behind condition is satisfied when the get-in estimation condition is satisfied from a time a previous vehicle height adjustment is performed to a time before the mobile apparatus gets out of a communication area. For example, if the door is unlocked and is opened before a long time elapses after a person gets off the vehicle and the door is locked, it is estimated that the door is unlocked and opened, not to ride in and start the vehicle, but to take out a thing-left-behind from the vehicle.

What is claimed is:

1. A vehicle height adjustment system comprising:
   a vehicle height adjustment actuator provided for each wheel of a vehicle;
   a pressure medium intake and exhaust device configured to supply and exhaust a pressure medium to and from the vehicle height adjustment actuator; and
   a vehicle height adjustment unit including a computer, the vehicle height adjustment unit being configured to:
   adjust a vehicle height by controlling the pressure medium intake and exhaust device, the vehicle height being a distance between each wheel and a vehicle body;
   adjust the vehicle height when a get-in estimation condition is satisfied; and
   limit, upon the get-in estimation condition being satisfied, a number of times the vehicle height is adjusted within a set period of time to less than a predetermined number of times.

2. The vehicle height adjustment system according to claim 1, wherein the set period is a period from a time an ignition switch of the vehicle is switched from ON to OFF to a time the ignition switch is switched from OFF to ON.

3. The vehicle height adjustment system according to claim 1, wherein the set period includes a plurality of periods, each being a period from a time an ignition switch of the vehicle is switched from ON to OFF to a time the ignition switch is switched from OFF to ON.

4. The vehicle height adjustment system according to claim 1, wherein:
   the vehicle height adjustment system operates on power supplied from a battery, and
   the vehicle height adjustment unit is configured to determine the predetermined number of times based on a state of the battery.

5. The vehicle height adjustment system according to claim 1, wherein the predetermined number of times is a value equal to or larger than three.

6. The vehicle height adjustment system according to claim 1, wherein:
   the vehicle height adjustment system operates on a power supplied from a battery, and
   the vehicle height adjustment unit is configured to determine an operation amount of the vehicle height adjustment actuator based on a state of the battery.

7. The vehicle height adjustment system according to claim 1, wherein the vehicle height adjustment unit is configured in such a way that an operation amount of the vehicle height adjustment actuator decreases as the number of times vehicle height is adjusted increases.

8. The vehicle height adjustment system according to claim 1, wherein the vehicle height adjustment unit is configured to count the number of times the vehicle height is adjusted within the set period of time, upon the get-in estimation condition is satisfied.

9. The vehicle height adjustment system according to claim 8, wherein the vehicle height adjustment unit is configured not to count the number of times the vehicle height is adjusted within the set period of time, upon a thing-left-behind condition is satisfied.

10. The vehicle height adjustment system according to claim 9, wherein the vehicle height adjustment unit is configured to determine that the thing-left-behind condition is satisfied upon the get-in estimation condition being satisfied before a set time elapses from a time a previous vehicle height adjustment is terminated.

11. The vehicle height adjustment system according to claim 9, further comprising:
    a communication device that carries out communication with a mobile apparatus,
    wherein the vehicle height adjustment unit is configured to determine the thing-left-behind condition is satisfied upon the get-in estimation condition being satisfied between a time when a previous vehicle height adjustment is performed to a time prior to the mobile apparatus leaving a communication area.

12. A vehicle height adjustment system comprising:
    a vehicle height adjustment actuator provided for each wheel of a vehicle;
    a pressure medium intake and exhaust device configured to supply and exhaust a pressure medium to and from the vehicle height adjustment actuator; and
    a vehicle height adjustment unit including a computer, the vehicle height adjustment unit being configured to:
    adjust a vehicle height by controlling the pressure medium intake and exhaust device, the vehicle height being a distance between each wheel and a vehicle body; and
    limit, upon a get-in estimation condition being satisfied, a number of times the vehicle height adjustment is performed while an ignition switch is set to OFF to less than a predetermined number of times.

* * * * *